(12) United States Patent
Choi et al.

(10) Patent No.: US 11,320,872 B2
(45) Date of Patent: May 3, 2022

(54) CONVERTIBLE ELECTRONIC DEVICE

(71) Applicant: Samsung Display Co., LTD., Yongin-si (KR)

(72) Inventors: Bo Kyung Choi, Seongnam-si (KR); Young Seok Kim, Seoul (KR); Han Na Ma, Suwon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/109,922

(22) Filed: Dec. 2, 2020

(65) Prior Publication Data

US 2021/0247819 A1 Aug. 12, 2021

(30) Foreign Application Priority Data

Feb. 11, 2020 (KR) .......................... 10-2020-0016170

(51) Int. Cl.
*G06F 1/16* (2006.01)

(52) U.S. Cl.
CPC .......... *G06F 1/1686* (2013.01); *G06F 1/1616* (2013.01); *G06F 1/1662* (2013.01)

(58) Field of Classification Search
CPC .... G06F 1/1616; G06F 1/1618; G06F 1/1662; G06F 1/1686
See application file for complete search history.

(56) References Cited

U.S. PATENT DOCUMENTS

| | | | | |
|---|---|---|---|---|
| 6,243,258 B1* | 6/2001 | Paratore | ................ | G06F 1/1618 345/168 |
| 10,126,781 B2* | 11/2018 | Ahn | ........................ | G06F 1/1605 |
| 10,869,000 B2* | 12/2020 | Erna | ................ | H04N 21/41407 |
| 11,019,239 B2* | 5/2021 | Fletcher | ................ | G06F 1/1686 |
| 11,032,450 B2* | 6/2021 | Lim | ........................ | H04N 5/2254 |
| 11,057,506 B2* | 7/2021 | Zeng | ........................ | H04M 1/18 |
| 2012/0105400 A1* | 5/2012 | Mathew | ................ | G06F 1/1686 345/207 |
| 2013/0328051 A1* | 12/2013 | Franklin | ................ | H05K 1/028 257/59 |
| 2014/0225131 A1* | 8/2014 | Benson | ................... | H01L 31/18 257/82 |

(Continued)

FOREIGN PATENT DOCUMENTS

| | | |
|---|---|---|
| KR | 1020160130042 | 11/2016 |
| KR | 1020210097877 | 8/2021 |

*Primary Examiner* — Adrian S Wilson
(74) *Attorney, Agent, or Firm* — Cantor Colburn LLP

(57) ABSTRACT

A convertible electronic device includes a display module including a first region and a second region surrounding the first region and having a lower light transmittance than the first region; a camera module disposed on the display module to overlap the first region; a first housing which accommodates the display module therein, and includes a camera module accommodating portion protruding outwardly to overlap the camera module; a keyboard; a second housing which accommodates the keyboard therein; and a hinge member connecting the first housing to the second housing rotatably to each other with respect to a rotation shaft. The first and second housings are in a first folded state where the first and second housings overlap each other to allow front surfaces to face each other or in a second folded state where the first and second housings overlap each other to allow rear surfaces to face each other.

20 Claims, 10 Drawing Sheets

(56) References Cited

U.S. PATENT DOCUMENTS

| | | | | |
|---|---|---|---|---|
| 2014/0253799 A1* | 9/2014 | Moon | .................. | H04N 5/2253 |
| | | | | 348/376 |
| 2017/0094038 A1* | 3/2017 | Chen | .................... | H04N 5/2257 |
| 2017/0094168 A1* | 3/2017 | Kang | .................... | G06F 1/1677 |
| 2018/0262602 A1* | 9/2018 | Zhang | ..................... | H04M 1/03 |
| 2019/0394373 A1* | 12/2019 | Zhang | ................ | H04M 1/0264 |
| 2021/0135160 A1* | 5/2021 | Sun | ..................... | H01L 27/3225 |
| 2021/0241719 A1* | 8/2021 | Choi | .................... | G09G 3/2007 |
| 2021/0272515 A1* | 9/2021 | Choi | .................... | G09G 3/3233 |

\* cited by examiner (a)

(b)

(a)　　　　　　　　　　(b)

CONVERTIBLE ELECTRONIC DEVICE

This application claims priority to Korean Patent Application No. 10-2020-0016170, filed on Feb. 11, 2020, and all the benefits accruing therefrom under 35 U.S.C. § 119, the content of which in its entirety is herein incorporated by reference.

BACKGROUND

1. Field

The disclosure relates to a convertible electronic device.

2. Description of the Related Art

In a convertible electronic device, a display may be rotatably connected to a main body by a hinge device. The convertible electronic device provides, using the hinge device, a stop force at an angle comfortable to look at the display or to type, so that a user may perform an input operation comfortably and may view displayed information comfortably in various modes.

For example, a convertible laptop may be used as a general laptop by rotating a display up to about 180 degrees with respect to a main body, or may be used as a tablet personal computer ("PC") by rotating the display up to about 360 degrees with respect to the main body.

SUMMARY

Embodiments of the disclosure provide a convertible display device with reduced bezel area.

Embodiments of the disclosure also provide a convertible electronic device in which interference between housings is effectively prevented.

An embodiment of a convertible electronic device includes a display module including a first region and a second region disposed to surround at least a portion of the first region, where the second region has a lower light transmittance than the first region; a camera module disposed on a rear surface of the display module to overlap the first region in a thickness direction; a first housing which accommodates the display module therein to be exposed through a front surface thereof, where the first housing includes a camera module accommodating portion protruding to an outside to overlap the camera module in the thickness direction; a keyboard; a second housing which accommodates the keyboard therein to be exposed through a front surface thereof; and a hinge member which connects the first housing and the second housing to each other and rotatably with respect to a rotation shaft. In such an embodiment, the first housing and the second housing are in a first folded state where the first housing and the second housing overlap each other in a way such that the front surface of the first housing and the front surface of the second housing face each other or in a second folded state where the first housing and the second housing overlap each other in a way such that a rear surface of the first housing and a rear surface of the second housing face each other.

An embodiment of a convertible electronic device includes a display module including a first region and a second region disposed to surround at least a portion of the first region and having a lower light transmittance than the first region; a sensor device disposed on a rear surface of the display module to overlap the first region; a first housing which accommodates the display module therein to be exposed through a front surface thereof, where the first housing includes a sensor device accommodating portion protruding to an outside to overlap the sensor device; a second housing; and a hinge member which connects the first housing and the second housing to each other and rotatably with respect to a rotation shaft. In such an embodiment, the first housing and the second housing are in a first folded state where the first housing and the second housing overlap each other in a way such that the front surface of the first housing and a front surface of the second housing face each other or in a second folded state where the first housing and the second housing overlap each other in a way such that a rear surface of the first housing and a rear surface of the second housing face each other.

In embodiments, a convertible electronic device may provide a wide display screen.

In embodiments, a convertible electronic device may effectively prevent interference between housings when folded.

BRIEF DESCRIPTION OF THE DRAWINGS

The above and other features of the disclosure will become more apparent by describing in detail embodiments thereof with reference to the attached drawings, in which.

DETAILED DESCRIPTION

Figure 1:
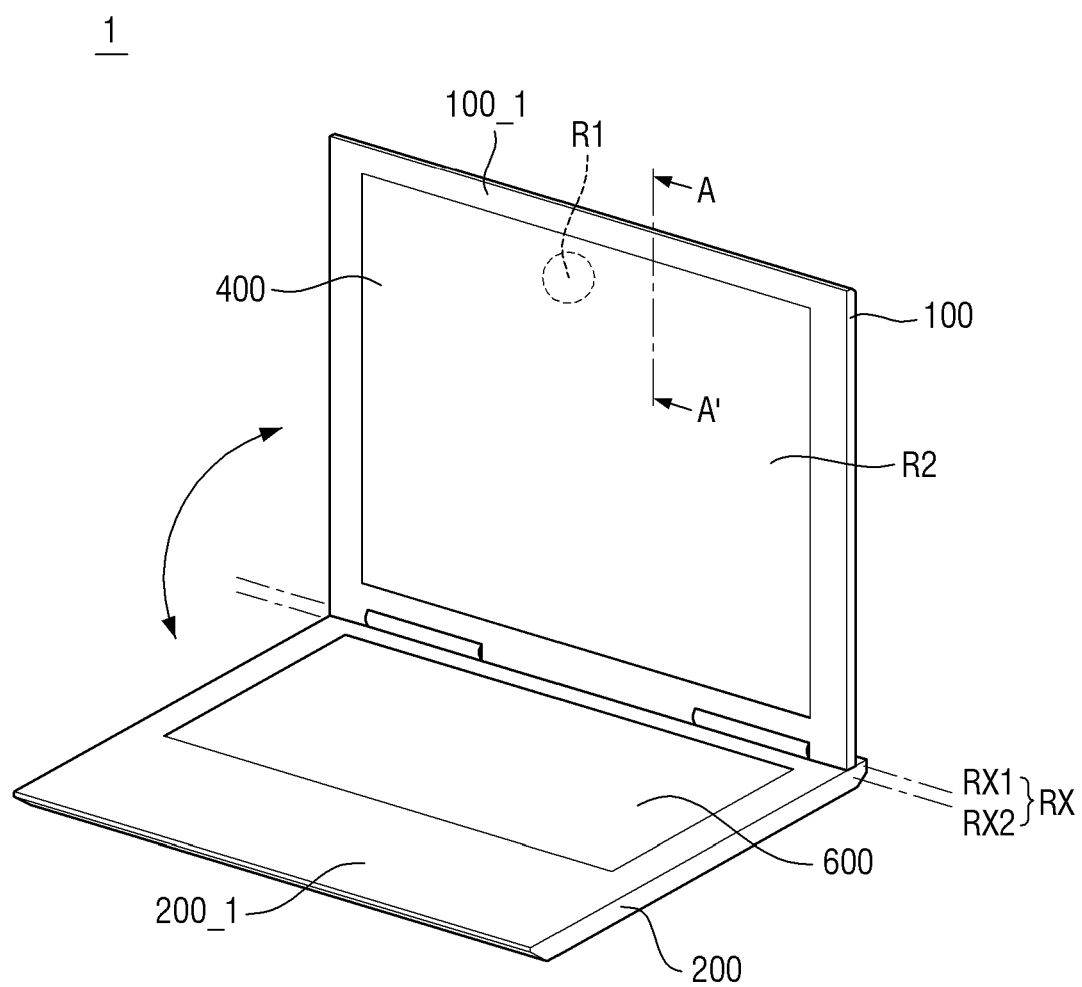
FIG. 1 is a perspective view of a convertible electronic device according to an embodiment.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," etc. may be used herein to describe various elements, these elements should not be limited by these terms. These terms are only used to distinguish one element from another element. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A convertible electronic device according to embodiments of the disclosure may include at least one of, e.g., a smartphone, a tablet personal computer ("PC"), a mobile phone, a video phone, and an e-book reader, a desktop PC, a laptop PC, a laptop computer, a workstation, a server, a personal digital assistant ("PDA"), a portable multimedia player ("PMP"), an MP3 player, a mobile medical device, a camera, a wearable device (e.g., smart glasses or a head-mounted-device ("HMD")), electronic clothing, an electronic bracelet, an electronic necklace, an electronic accessory, an electronic tattoo, a smart mirror, or a smart watch. The electronic device according to an embodiment of the disclosure is not limited to the aforementioned devices, and may be a medical device, a measurement device, or the like, and may include a new electronic device according to technology development.

Hereinafter, embodiments of the disclosure will be described in detail with reference to the accompanying drawings.

Figure 2:
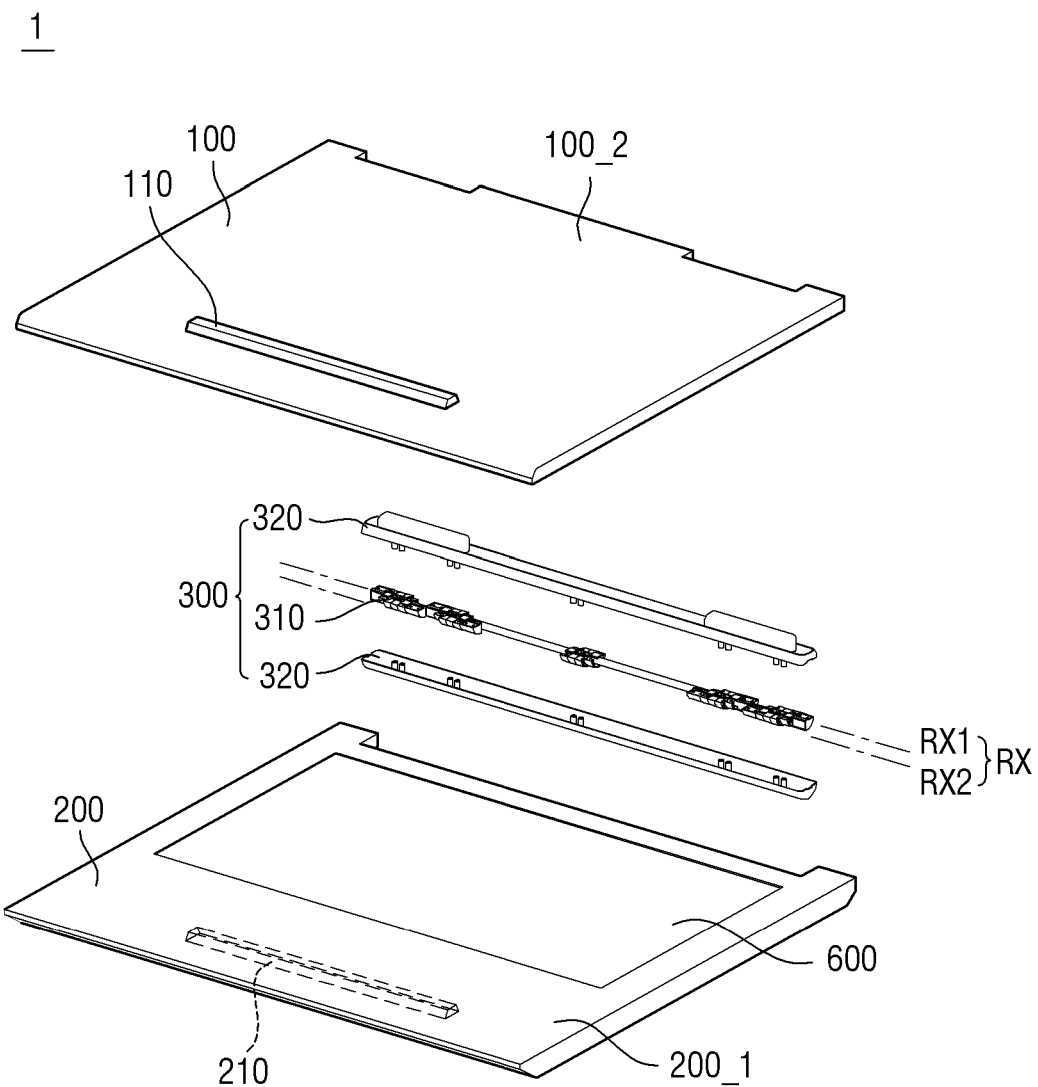
FIG. 2 is an exploded perspective view of the convertible electronic device of FIG. 1.
Figure 3:
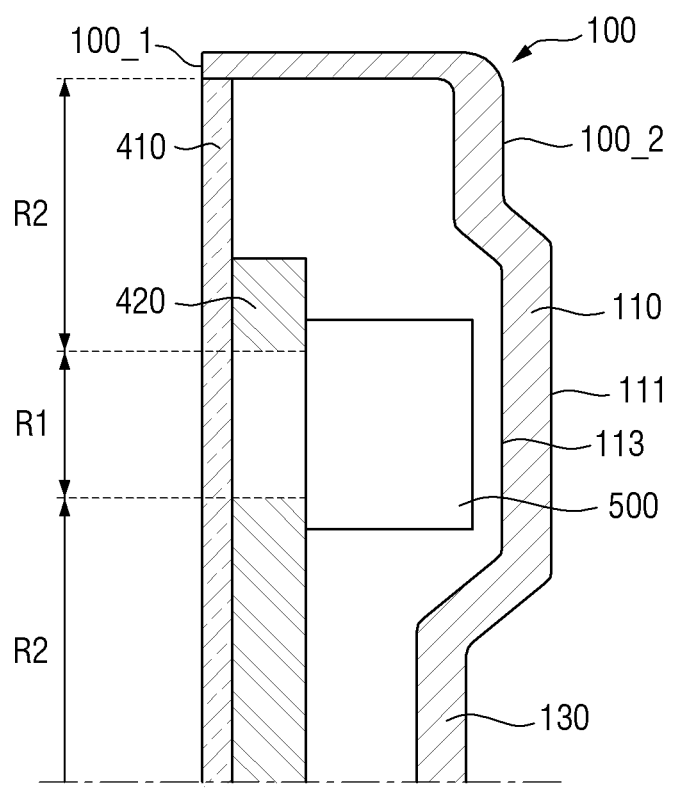
FIG. 3 is a cross-sectional view taken along line A-A' of FIG. 1.

FIG. 1 is a perspective view of a convertible electronic device according to an embodiment. FIG. 2 is an exploded perspective view of the convertible electronic device of FIG. 1. FIG. 3 is a cross-sectional view taken along line A-A' of FIG. 1.

Referring to FIGS. 1 to 3, an embodiment of a convertible electronic device 1 may include a first housing 100, a second housing 200, and a hinge member 300. The convertible electronic device 1 may further include at least one selected from a display module 400, a camera module 500 and a keyboard 600.

The first housing 100 contains a display element. In an embodiment, the first housing 100 may include the display module 400 exposed through a front surface thereof. In an embodiment, the display module 400 may include an input means such as a touch sensor. The camera module 500 may be mounted inside the first housing 100. In an embodiment, the camera module 500 may be mounted in a space between a front surface 100_1 and a rear surface 100_2 of the first housing 100 or in a space between the display module 400 and the rear surface 100_2 of the first housing 100.

The second housing 200 contains an input means. In an embodiment, the second housing 200 may contain the keyboard 600 exposed through a front surface thereof.

The hinge member 300 connects the first housing 100 and the second housing 200 to each other in a way such that the first housing 100 and the second housing 200 rotate about a rotation shaft RX. The rotation shaft RX includes a first rotation shaft RX1 and a second rotation shaft RX2. The first housing 100 and the second housing 200 may be rotated about the first rotation shaft RX1 and the second rotation shaft RX2, respectively. The hinge member 300 may include a biaxial hinge device 310 and a hinge cover 320 that covers the biaxial hinge device 310.

The display module 400 is exposed through the front surface 100_1 of the first housing 100. The display module 400 may include a display panel 420. The display panel 420 may be a liquid crystal display panel, an electrophoretic display panel, an organic light emitting display panel, a plasma display panel, a field emission display panel, an electrowetting display panel, a quantum dot light emitting display panel, a micro LED display panel, or the like, but is not limited thereto.

The display module 400 may further include a window 410 disposed to cover at least a portion of the front surface 100_1 of the first housing 100 and a display panel 420 disposed on a rear surface of the window 410.

In an embodiment, a first region R1 and a second region R2 may be defined in the display module 400.

The first region R1 transmits most of external light incident to the front of the display module 400. The external light incident to the front of the display module 400 may be transmitted to the camera module 500 or a sensor device disposed behind the display module 400 through the first region R1. In an embodiment, as shown in FIGS. 1 to 3, the first region R1 may have a circular shape, but the size and shape of the first region R1 is not limited thereto. In an embodiment, as shown in FIG. 3, the first region R1 may be smaller than a region occupied by the camera module 500, but not being limited thereto. Alternatively, the first region R1 may be formed larger than the region occupied by the camera module 500. In an embodiment, the first region R1 may selectively transmit or block light in a specific wavelength band. In an embodiment, the first region R1 may be a region corresponding to a hole defined through at least one layer constituting the display panel 420.

The first region R1 may include a region in which pixels for display are omitted. Arrangement of pixels in the first region R1 and the second region R2 will be described later in detail with reference to FIGS. 4 and 5.

The second region R2 is a region having a lower light transmittance than the first region R1. The second region R2 may be a region that transmits or blocks a smaller amount of light incident to the front of the display module 400 than the first region R1. In an embodiment, the second region R2 may selectively transmit or block light in a specific wavelength band.

The second region R2 may be arranged to surround at least a portion of the first region R1. The second region R2 may be arranged at a side portion of the first region R1, for example, at an upper side portion of the first region R1 as shown in FIG. 1, but is not limited thereto. In an alternative embodiment, the second region R2 may be arranged adjacent to a corner of the display module 400. In an embodiment, the second region R2 may be provided in plural. In an embodiment, only the first region R1 or only the second region R2 may be defined in the display module 400.

The camera module 500 is disposed on a rear surface of the display module 400 to overlap the first region R1 in a thickness direction thereof. The camera module 500 may receive the external light passed through the first region R1 of the display module 400 to generate image data. In such an embodiment where the camera module 500 is disposed behind the display module 400, the convertible electronic device 1 may have a thin bezel area.

The camera module 500 may be replaced with a sensor device such as a proximity sensor, an illumination sensor, an iris sensor, or the like.

Referring to FIGS. 1 to 3, the first housing 100 may further include a camera module accommodating portion 110.

The camera module accommodating portion 110 is disposed to overlap the camera module 500 in the thickness direction. The camera module accommodating portion 110 may be formed by protruding backwards a part forming the rear surface 100_2 of the first housing 100. In the camera module accommodating portion 110, an outer surface 111 may protrude and an inner surface 113 may be recessed so that the camera module 500 may be accommodated inside the first housing 100. The outer surface 111 may be a surface facing an outside, and the inner surface 113 may be a surface facing the camera module 500. The inner surface 113 of the camera module accommodating portion 110 may form an inner space for accommodating at least a part of the camera module 500. The camera module accommodating portion 110 may be a sensor device accommodating portion. The camera module accommodating portion 110 may be provided in plural.

The inner surface of the camera module accommodating portion 110 may be spaced apart from the camera module 500 to protect the camera module 500 from an external impact.

The first housing 100 may further include a display module cover portion 130 extending parallel to the rear surface of the display module 400.

The display module cover portion 130 extends from one end of the camera module accommodating portion 110 in parallel with the display module 400. The display module cover portion 130 may be a peripheral part connected to or spaced apart from the camera module accommodating portion 110. In an embodiment, the display module cover portion 130 may be a part excluding the camera module accommodating portion 110 from the back surface 100_2 of the first housing 100. The display module cover portion 130 may be disposed closer to the display module 400 than the camera module accommodating portion 110. In an embodiment, a distance between the display module 400 and the display module cover portion 130 may be smaller than a distance between the display module 400 and the camera module accommodating portion 110. A distance between the display module 400 and the display module cover portion 130 may be smaller than the thickness of the camera module 500. The distance may be measured in the thickness direction of the display module 400.

The second housing 200 may further include a groove portion 210 disposed on the rear surface 200_2 of the second housing 200 and recessed inwardly or toward the front surface 200_1. The groove portion 210 will be described later in detail with reference to FIGS. 7 and 8.

Referring to FIG. 3, the window 410 may be disposed on an open front surface of the first housing 100, and the display panel 420 may be disposed on a rear surface of the window 410.

The camera module 500 is disposed between the display panel 420 and the camera module accommodating portion 110. The camera module 500 may be disposed directly on a rear surface of the display panel 420. The first region R1 of the display panel 420, the camera module 500, and the camera module accommodating portion 110 may be arranged to at least partially overlap each other in the thickness direction. In one embodiment, for example, the camera module 500 may be disposed to completely cover the first region R1. In such an embodiment, a longitudinal width of the camera module 500 may be larger than a longitudinal width of the first region R1. Here, the longitudinal widths may be measured along an up and down direction of FIG. 3, for example. The camera module accommodating portion 110 covers the rear of the camera module 500. The camera module accommodating portion 110 may be configured to have a C-like cross-sectional shape as shown in FIG. 3, and accommodate at least a portion of the camera module 500 at an open side of the C-like shape.

The camera module accommodating portion 110 allows the first housing 100 to have a thin thickness as a whole. If a thickness of the window 410 is about 0.4 millimeter (mm), a thickness of the display panel 420 is about 1.2 mm, a thickness of the camera module 500 is about 2.3 mm, and a wall thickness of the first housing 100 is about 0.8 mm, for example, to accommodate the camera module 500 inside the first housing 100, a thickness (or depth) of the first housing 100 may be at least in a range of about 4.7 mm to 5.0 mm. However, in an embodiment, only a partial region overlapping the camera module 500, i.e., only the camera module accommodating portion 110, protrudes to the outside, the first housing 100 may have a thickness (or depth) of about 4.4 mm or less at a part where the camera module 500 is not disposed. The thicknesses of the window 410, the display panel 420, the camera module 500, and the first housing 100 described above are merely exemplary, and are not limited thereto.

Figure 4:
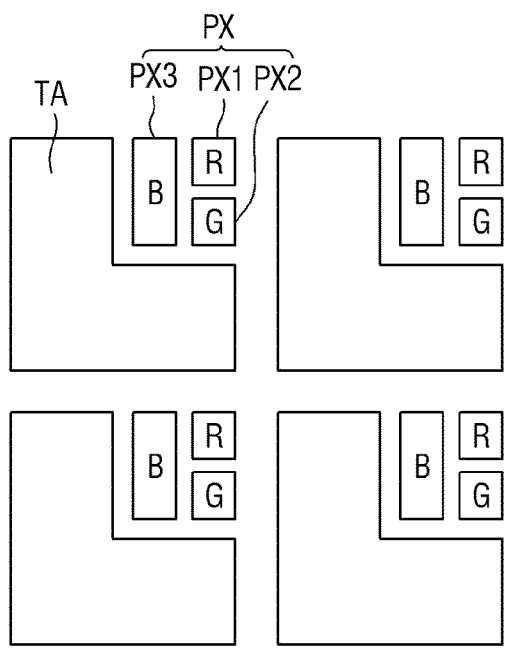
FIG. 4 is a diagram conceptually illustrating an arrangement of pixels in a first region and a second region of the convertible electronic device of FIG. 1.
Figure 4:
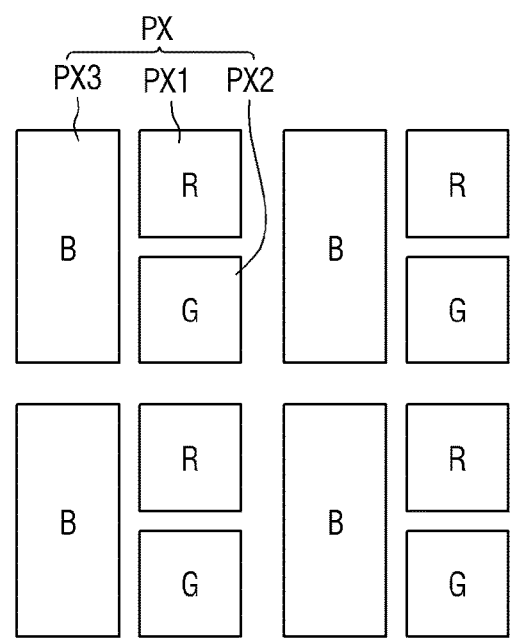

FIG. 4 is a diagram conceptually illustrating an arrangement of pixels in the first region and the second region of the convertible electronic device of FIG. 1.

In FIG. 4, (a) is a diagram showing an arrangement of pixels in the first region, and (b) is a diagram showing an arrangement of pixels in the second region.

Referring to (a) and (b) of FIG. 4, each of the first region and the second region may include a plurality of pixels.

The plurality of pixels PX of each of the first region and the second region may include a first sub-pixel PX1, a second sub-pixel PX2, and a third sub-pixel PX3 that emit light of different colors from each other. The sub-pixels may be in a rectangular shape, but the shape and arrangement of the sub-pixels are not limited thereto.

Referring to (a) of FIG. 4, the first region R1 may further include a transmissive portion TA disposed between the plurality of pixels PX.

The transmissive portion TA is an area through which incident light passes substantially as it is. That is, an object or background disposed on the rear surface of the display panel 420 may be viewed through the transmissive portion TA.

In an embodiment, the display panel 420 may be an organic light emitting diode display panel. In such an embodiment, the transmissive portion TA may be a region where light transmissive layers, such as a buffer film, an insulating film, a protective film, a planarization film, an encapsulation layer, and an electrode layer constituting the organic light emitting diode display panel, are stacked one on another. Alternatively, the transmissive portion TA may be a region where all or a part of a buffer film, an insulating film, a protective film, a planarization film, an encapsulation layer, and an electrode layer constituting the organic light emitting diode display panel is removed or omitted to increase light transmittance.

Referring to (a) of FIG. 4, an area of the transmissive portion TA may be larger than an area of each of the plurality of pixels PX. The transmissive portion TA may be arranged to surround a corner portion of a region of each of the plurality of pixels PX. However, the shape, size, and arrangement of the transmissive portion TA are not limited thereto.

Referring to (b) of FIG. 4, unlike the first region R1, the second region R2 does not include the transmissive portion TA, and thus has a lower light transmittance than the first region R1.

Referring to (a) and (b) of FIG. 4, the size of the plurality of pixels PX arranged in the first region R1 may be smaller than the size of the plurality of pixels PX arranged in the second region R2. The number of the plurality of pixels PX arranged in the first region R1 may be equal to the number of the plurality of pixels PX arranged in the second region R2.

Figure 5:
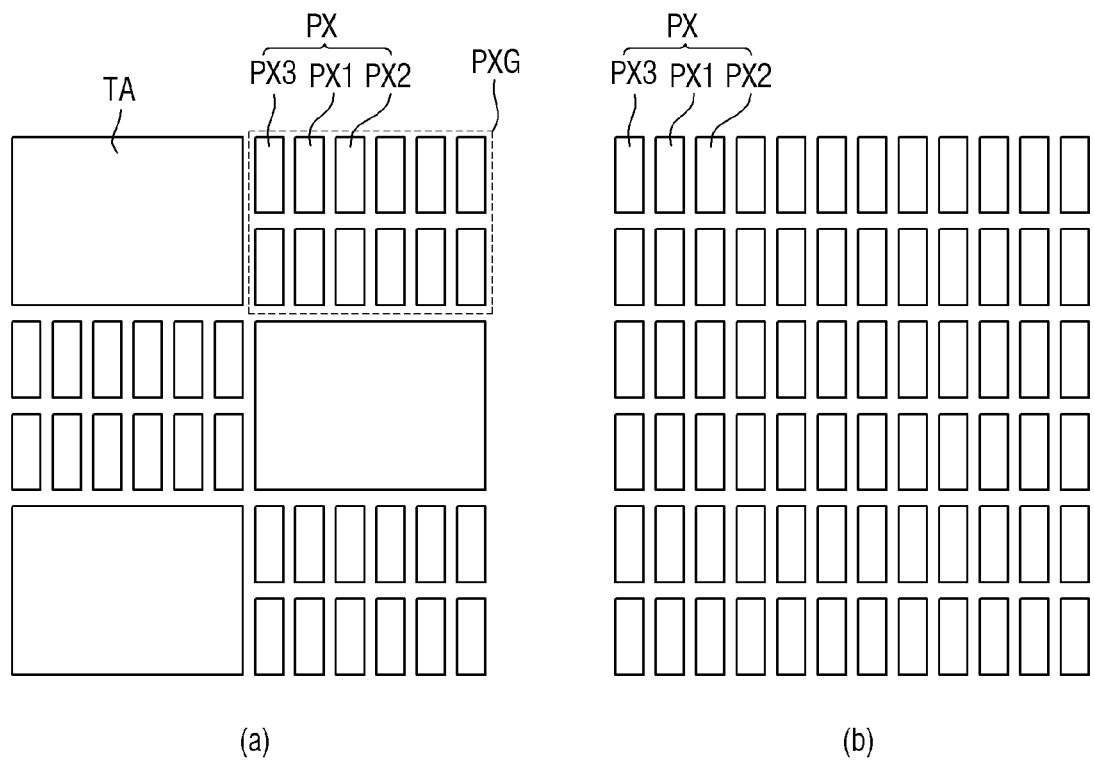
FIG. 5 is a diagram conceptually illustrating an arrangement of pixels in a first region and a second region of a convertible electronic device according to an alternative embodiment.

FIG. 5 is a diagram conceptually illustrating an arrangement of pixels in a first region and a second region of a convertible electronic device according to an alternative embodiment.

In FIG. 5, (a) is a diagram showing an arrangement of pixels in the first region, and (b) is a diagram showing an arrangement of pixels in the second region.

An embodiment of FIG. 5 is substantially the same as the embodiment of FIG. 4 except that the plurality of pixels PX arranged in the first region R1 and the plurality of pixels PX arranged in the second region R2 have the same size but the number of the pixels PX arranged in the first region R1 is fewer than the number of the pixels PX arranged in the second region R2.

Referring to (a) of FIG. 5, the pixels PX arranged in the first region R1 may collectively form or define a pixel group PXG. Transmissive portions TA may be disposed on four sides of the pixel group PXG. In such an embodiment, the pixel groups and the transmissive portions TA may be alternately arranged along a first direction and along a second direction crossing the first direction. The first direction may be a horizontal direction, and the second direction may be a vertical direction. In FIG. 5, (a) illustrates an embodiment in which the transmissive portions TA and pixel groups PXG having a rectangular shape are alternately arranged, but the shapes of the transmissive portions TA and the pixels PX and the arrangement thereof are not limited thereto.

Referring to (a) and (b) of FIG. 5, in the first region R1, a partial area where a plurality of pixels PX are arranged is replaced by the transmissive portion TA, so that the first region R1 may have a higher light transmittance than the second region R2.

Figure 6:
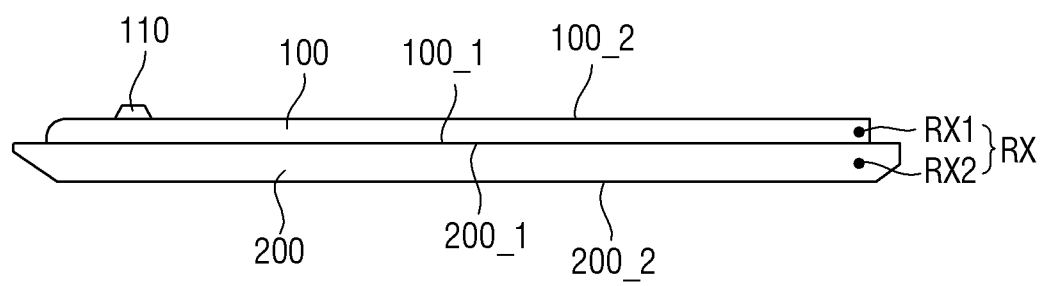
FIG. 6 is a side view of the convertible electronic device in a first folded state.
Figure 7:
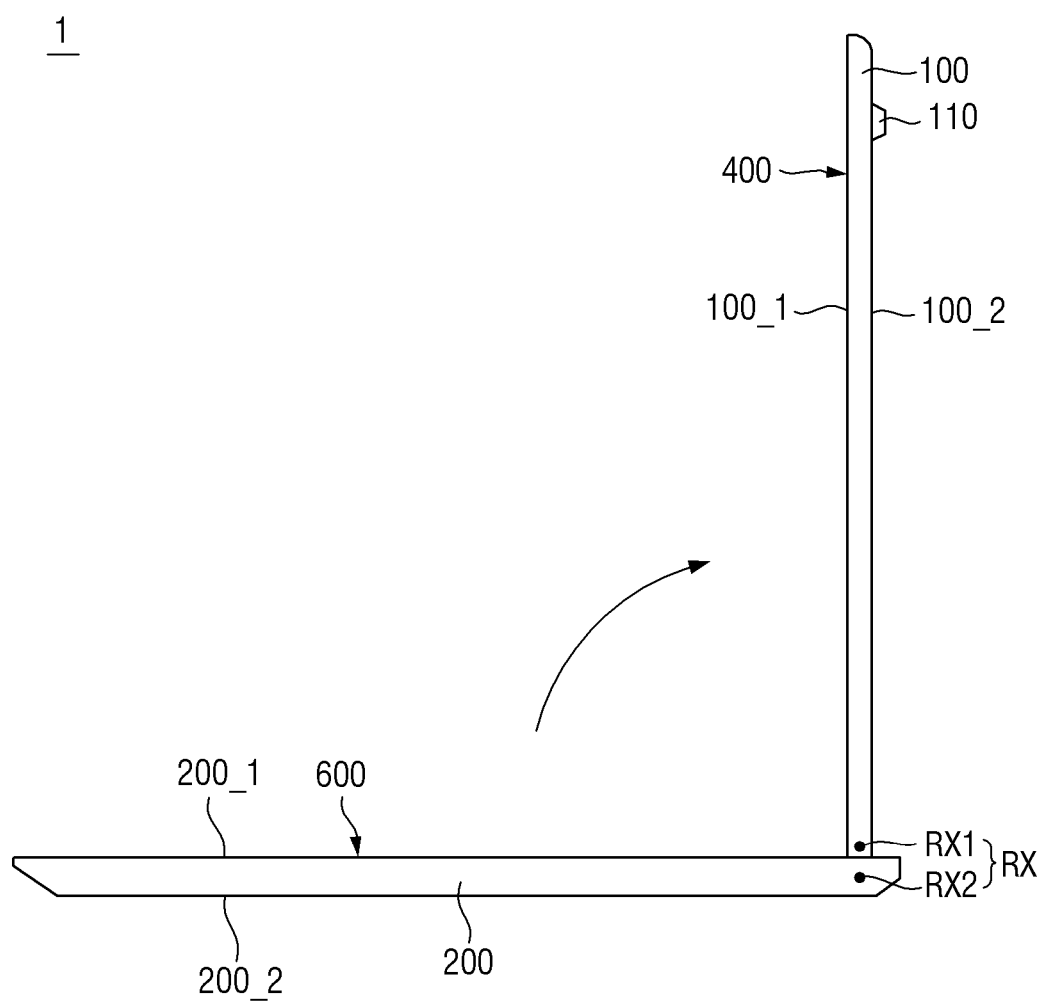
FIGS. 7 and 8 are side views of the convertible electronic device in an unfolded state.
Figure 8:
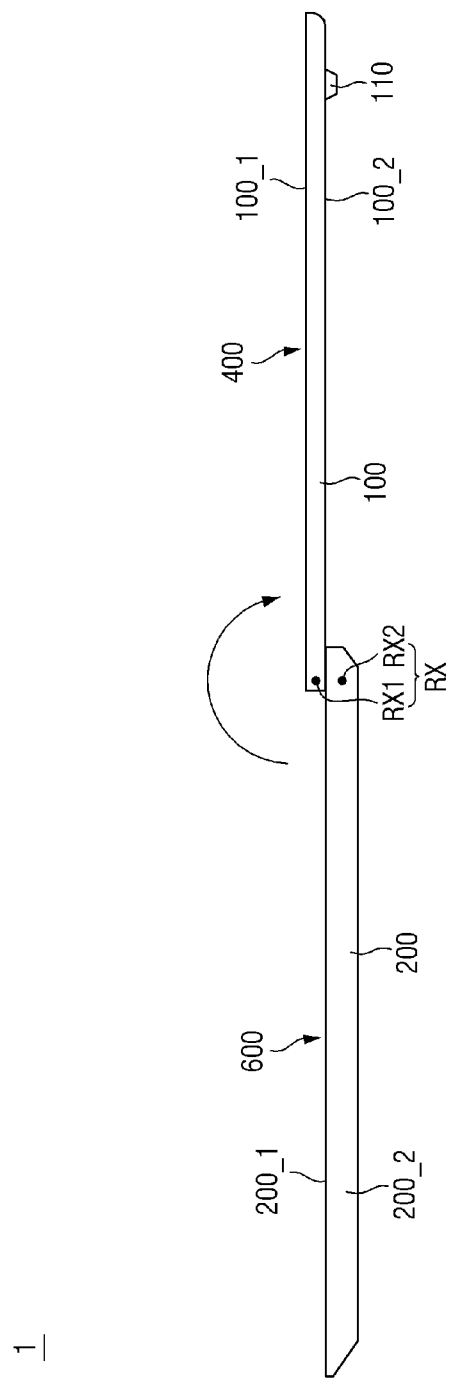
Figure 9:
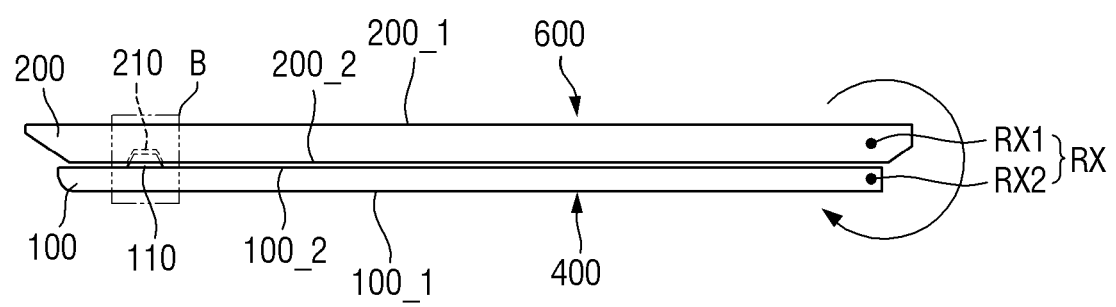
FIG. 9 is a side view of the convertible electronic device in a second folded state.

FIG. 6 is a side view of the convertible electronic device in a first folded state. FIGS. 7 and 8 are side views of the convertible electronic device in an unfolded state. FIG. 9 is a side view of the convertible electronic device in a second folded state.

Referring to FIGS. 1 to 9, as described above, the first housing 100 and the second housing 200 may be connected to each other and rotatable with respect to the rotation shaft RX.

The camera module accommodating portion 110 and the groove portion 210 may be disposed substantially symmetrically about the rotation shaft RX. A distance from the camera module accommodating portion 110 to the rotation shaft RX may be the same as a distance from the groove portion 210 to the rotation shaft RX. In an embodiment, a distance from the camera module accommodating portion 110 to the first rotation shaft RX1 may be the same as a distance from the groove portion 210 to the second rotation shaft RX2.

Referring to FIG. 6, the first housing 100 and the second housing 200 may have a first folded state. The first folded state may be a state where the first housing 100 and the second housing 200 overlap in a thickness direction such that front surfaces 100_1 and 200_1 thereof face each other. In an embodiment, the first folded state may be a state where the display module 400 and the keyboard 600 overlap to face each other. In an embodiment, the first folded state may be a state where the camera module accommodating portion 110 is exposed to the outside without being accommodated in the groove portion 210. In an embodiment, the first folded state may be a state where angles formed between the front surface of the first housing 100 and the front surface of the second housing 200 are in a range of about 0 degree to 5 degrees with respect to the rotation shaft RX.

In the first folded state, the rear surface of the first housing 100 and the rear surface of the second housing 200 are disposed to face the outside, so that interference between the camera module accommodating portion 110 and the second housing 200 does not occur.

Referring to FIGS. 7 and 8, the first housing 100 and the second housing 200 may have an unfolded state. The unfolded state may be a state where the front surface 100_1 of the first housing 100 and the front surface 200_1 of the second housing 200 do not face each other. In an embodiment, the unfolded state may be a state where the angle formed by the first housing 100 and the second housing 200 is larger than about 0 degree or less than 360 degrees with respect to the rotation shaft RX.

In the unfolded state, the camera module accommodating portion 110 is exposed to the outside as in the first folded state.

Referring to FIG. 8, when the angle formed by the first housing 100 and the second housing 200 is about 180 degrees, the camera module accommodating portion 110 may support at least a portion of the rear surface 100_2 of the first housing 100 excepting the camera module accommodating portion 110 to be spaced apart from the ground by a predetermined height. In the unfolded state, a cover of the display panel 420 of FIG. 3 may be spaced apart from the ground. A protruding height of the camera module accommodating portion 110 may be the same as a thickness of the second housing 200. Accordingly, in the unfolded state, the front surface of the first housing 100 and the front surface of the second housing 200 may be disposed in parallel.

Referring to FIG. 9, the first housing 100 and the second housing 200 may be in a second folded state. The second folded state may be a state where the first housing 100 and the second housing 200 overlap in the thickness direction such that rear surfaces 100_2 and 200_2 thereof face to each other. In an embodiment, the second folded state may be a state where the display module 400 and the keyboard 600 overlap each other to face opposite directions. In an embodiment, the second folded state may be a state where the camera module accommodating portion 110 is accommodated in the groove portion 210. In an embodiment, the second folded state may be a state where an angle formed between the front surface of the first housing 100 and the front surface of the second housing 200 may be in a range of about 355 degrees to 360 degrees with respect to the rotation shaft RX.

In the second folded state, the camera module accommodating portion 110 is accommodated in the groove portion 210. Accordingly, the convertible electronic device 1 having a thin thickness and preventing interference between the camera module accommodating portion 110 and the second housing 200 may be implemented.

Figure 10:
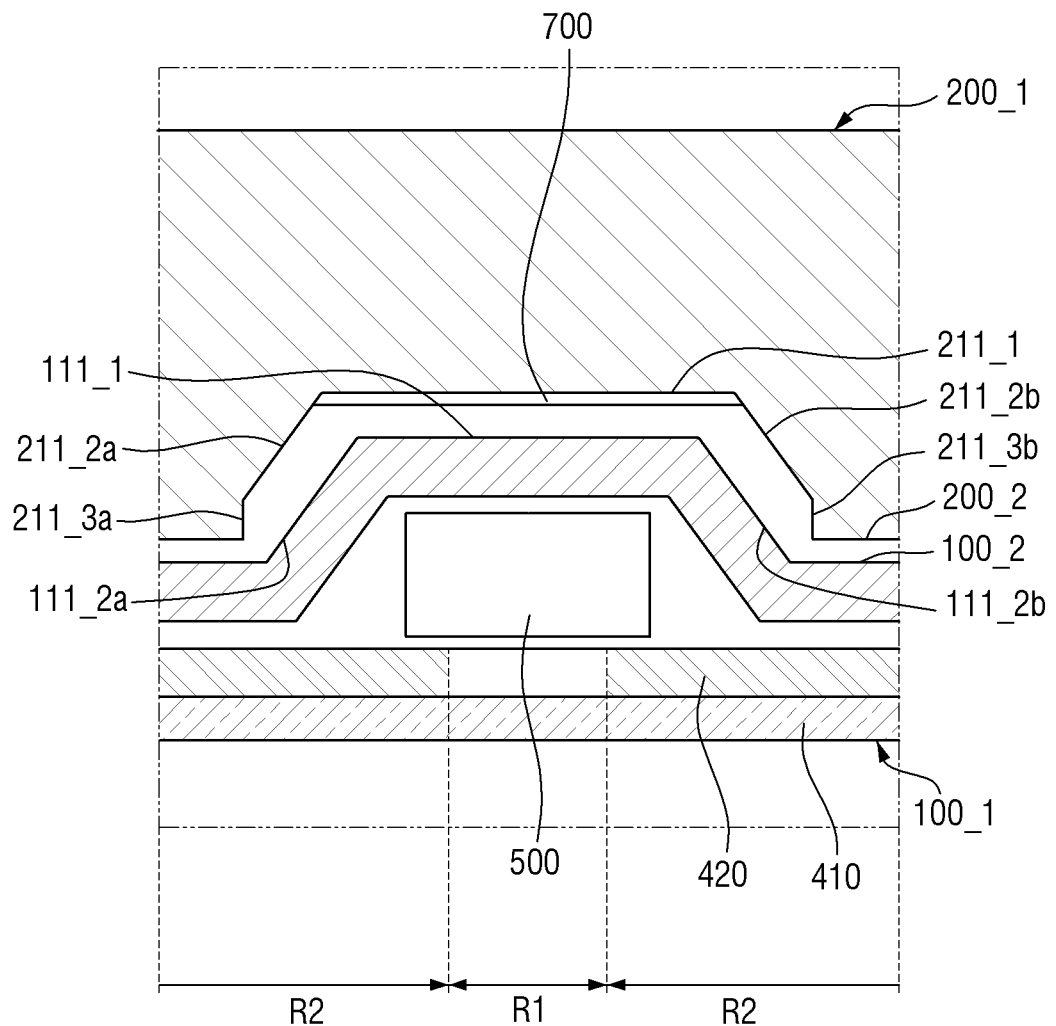
FIG. 10 is a cross-sectional view of portion B of FIG. 9.

FIG. 10 is a cross-sectional view of portion B of FIG. 9.

Referring to FIGS. 1 to 3, 9, and 10, in the second folded state, the camera module accommodating portion 110 may be accommodated in the groove portion 210 such that a part of the camera module accommodating portion 110 is spaced apart from the groove portion 210. The part of the camera module accommodating portion 110 may be an end par or an outermost part of the camera module accommodating portion 110. In such an embodiment, a maximum height of the camera module accommodating portion 110 may be smaller than a maximum depth of the groove portion 210.

The camera module accommodating portion 110 may include a first surface 111_1 extending in parallel with the rear surface of the display module 400, and a second surface 111_2 extending from one end of the first surface 111_1 to be inclined with respect to the first surface 111_1.

The second surface 111_2 may be disposed to be inclined in a direction crossing the rotation shaft RX. When the first folded state or the unfolded state is switched to the second folded state, the second surface 111_2 may guide the camera module accommodating portion 110 so that the camera module accommodating portion 110 may be easily inserted into the groove portion 210.

A longitudinal width of the first surface 111_1 may be greater than a longitudinal width of a third surface 211_1 or a longitudinal width of the camera module 500. The longitudinal direction may be a left and right direction in FIG. 8.

In the second folded state, the first surface 111_1 and the second surface 111_2 may be spaced apart from the groove portion 210. In an embodiment, the first surface 111_1 may be spaced apart from the groove portion 210, and the second surface 111_2 may be in close contact with the groove portion 210.

In an embodiment, as shown in FIG. 10, the second surfaces 111_2 may be disposed at opposing ends of the first surface 111_1.

In an alternative embodiment, the second surface 111_2 may be disposed only at one end of the first surface 111_1 and may be in close contact with an inner surface of the groove portion 210 in the second folded state to thereby provide a fixing force in the longitudinal direction.

The groove portion 210 may include the third surface 211_1 extending in parallel with the first surface 111_1 and spaced apart from the first surface 111_1, and a fourth surface 211_2 extending in parallel with the second surface 111_2 from one end of the third surface 211_1. The groove portion 210 may further include a fifth surface 211_3 extending in the thickness direction from one end of the fourth surface 211_2.

The fourth surface 211_2 may be disposed to be inclined along a direction crossing the rotation shaft RX. When the first folded state or the unfolded state is switched to the second folded state, the fourth surface 211_2 guides the camera module accommodating portion 110 so that the camera module accommodating portion 110 can be seated at a correct position.

In an embodiment, as shown in FIG. 10, the fourth surfaces 211_2 may be disposed at opposing ends of the third surface 211_1. The fourth surface 211_2a disposed on one side of the third surface 211_1 and the fourth surface 211_2b disposed on an opposing side of the third surface 211_1 may extend in parallel with the second surface 111_2a disposed on one side of the first surface 111_1 and one end of the second surface 111_2b disposed on an opposing side of the first surface 111_1, respectively.

In an alternative embodiment, the fourth surface 211_2 may be disposed only at one end of the third surface 211_1 and may be in close contact with the camera module accommodating portion 110 at the second folded state to thereby provide a fixing force in the longitudinal direction.

In another alternative embodiment, the second surface 111_2 and the fourth surface 211_2 may include a curved surface.

Referring to FIGS. 9 and 10, in the second folded state, the second surface 111_2 and the fourth surface 211_2 may be spaced apart from each other to protect the camera module 500 from an impact that may occur when switching to the second folded state.

In the second folded state, the fifth surface 211_3 may be disposed to be caught by one end of the second surface 111_2 disposed in an inward direction of the first housing 100. In one embodiment, for example, two or more second surfaces 111_2 and fifth surfaces 211_3 may be disposed symmetrically with respect to the first surface 111_1 and the third surface 211_1, respectively. In an embodiment, a distance between one end of the second surface 111_2a disposed on one side of the first surface 111_1 and one end of the second surface 111_2b disposed on the other side of the first surface 111_1 may be equal to a distance between the fifth surface 211_3a disposed on the one side of the third surface 211_1 and the fifth surface 211_3b disposed on the opposing side of the third surface 211_1. Accordingly, although the second surface 111_2 and the fourth surface 211_2 are spaced apart from each other in the second folded state, the fifth surface 211_3 may guide the camera module accommodating portion to a correct position.

Although not shown in FIG. 10, the fifth surface 211_3 may be omitted in the groove portion 210, and the second surface 111_2 and the fourth surface 211_2 may be disposed to closely contact each other in the second folded state. The second surface 111_2 and the fourth surface 211_2 may be in close contact with each other to thereby disperse the direction of a force applied to the camera module 500 or the display panel 420 and prevent additional provision of the camera module accommodating portion 110.

Referring to FIG. 10, the convertible electronic device 1 may further include a buffer member 700 for reducing a shock or impact caused by the state switching of the first housing 100 and the second housing 200. The buffer member 700 may be disposed in the groove portion 210. In an embodiment, the buffer member 700 may be disposed to cover the first surface 111_1. In an alternative embodiment, the buffer member 700 may be arranged to protrude from the rear surface 200_2 of the second housing 200 along the edge of the groove portion 210.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:
   a display module including a first region and a second region disposed to surround at least a portion of the first region and having a lower light transmittance than the first region;
   a camera module disposed on a rear surface of the display module to overlap the first region in a thickness direction;
   a first housing having the display module mounted on a front surface thereof, the first housing being disposed to overlap the camera module in a thickness direction and including a camera module accommodating portion protruding to an outside;
   a keyboard;
   a second housing having the keyboard mounted on a front surface thereof; and
   a hinge member connecting the first housing to the second housing rotatably to each other with respect to at least one rotation shaft,
   wherein the first housing and the second housing have a first folded state where the first housing and the second housing overlap each other such that their front surfaces face each other and a second folded state where the first housing and the second housing overlap each other such that their rear surfaces face each other.

2. The electronic device of claim 1, wherein the camera module accommodating portion is configured such that an inner surface facing the camera module is recessed.

3. The electronic device of claim 2, wherein at least a portion of the camera module is accommodated in an inner space formed by the inner surface of the camera module accommodating portion.

4. The electronic device of claim 3, wherein the inner surface of the camera module accommodating portion is spaced apart from the camera module.

5. The electronic device of claim 3, wherein the first housing further includes a display module cover portion extending in parallel with the rear surface of the display module, and
   wherein a gap between the display module and the camera module accommodating portion is greater than a gap between the display module and the display module cover portion.

6. The electronic device of claim 1, wherein the second housing includes a groove portion recessed in a forward direction.

7. The electronic device of claim 6, wherein in the second folded state, the camera module accommodating portion is inserted into the groove portion.

8. The electronic device of claim 7, wherein a distance from the camera module accommodating portion to the at least one rotation shaft is the same as a distance from the groove portion to the at least one rotation shaft.

9. The electronic device of claim 7, wherein a maximum height of the camera module accommodating portion is smaller than a maximum depth of the groove portion.

10. The electronic device of claim 9, wherein the camera module accommodating portion includes a first surface extending in parallel with the rear surface of the display module; and a second surface extending from one end of the first surface to be inclined with the first surface, and
    wherein the groove portion includes a third surface extending in parallel with the first surface and spaced apart from the first surface; and a fourth surface extending in parallel with the second surface from one end of the third surface.

11. The electronic device of claim 10, wherein the groove portion includes a fifth surface extending in a thickness direction from one end of the fourth surface, and in the second folded state, the second surface and the fourth surface are spaced apart from each other.

12. The electronic device of claim 1, wherein the first region and the second region include a plurality of pixels, and the first region further includes a transmissive portion disposed between the plurality of pixels.

13. The electronic device of claim 12, wherein a size of the plurality of pixels in the first region is smaller than a size of the plurality of pixels in the second region.

14. The electronic device of claim 12, wherein the number of the plurality of pixels in the first region is smaller than the number of the plurality of pixels in the second region.

15. An electronic device comprising:
a display module including a first region and a second region disposed to surround at least a portion of the first region and having a lower light transmittance than the first region;
a sensor device disposed on a rear surface of the display module to overlap the first region;
a first housing having the display module disposed on a front surface thereof and including a sensor device accommodating portion protruding in a backward direction;
a second housing; and
a hinge member connecting the first housing to the second housing rotatably to each other with respect to at least one rotation shaft,
wherein the first housing and the second housing have a first folded state where the first housing and the second housing overlap each other such that their front surfaces face each other and a second folded state where the first housing and the second housing overlap each other such that their rear surfaces face each other.

16. The electronic device of claim 15, wherein the sensor device is at least one of a proximity sensor, an illuminance sensor, an iris sensor, or an image sensor.

17. The electronic device of claim 15, wherein the second housing includes a groove portion recessed in a forward direction.

18. The electronic device of claim 17, wherein in the second folded state, the sensor device accommodating portion is inserted into the groove portion.

19. The electronic device of claim 15, wherein the first region and the second region include a plurality of pixels, and the first region further includes a transmissive portion disposed between the plurality of pixels.

20. The electronic device of claim 19, wherein the sensor device accommodating portion includes a first surface extending in parallel with the rear surface of the display module; and a second surface extending from one end of the first surface to be inclined with the first surface, and wherein the groove portion includes a third surface extending in parallel with the first surface and spaced apart from the first surface; and a fourth surface extending in parallel with the second surface from one end of the third surface.

* * * * *